US008507229B2

(12) United States Patent
Lin et al.

(10) Patent No.: US 8,507,229 B2
(45) Date of Patent: Aug. 13, 2013

(54) ELECTROCHEMICAL METHOD FOR PRODUCING A BIODIESEL MIXTURE COMPRISING FATTY ACID ALKYL ESTERS AND GLYCEROL

(75) Inventors: YuPo J. Lin, Naperville, IL (US); Edward J. St. Martin, Libertyville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 512 days.

(21) Appl. No.: 12/767,168

(22) Filed: Apr. 26, 2010

(65) Prior Publication Data
US 2010/0261921 A1    Oct. 14, 2010

Related U.S. Application Data

(60) Provisional application No. 61/172,385, filed on Apr. 24, 2009.

(51) Int. Cl.
C12P 7/62    (2006.01)
C12P 7/20    (2006.01)
C12P 5/00    (2006.01)
B01D 61/44   (2006.01)
B01D 61/48   (2006.01)

(52) U.S. Cl.
USPC ............ 435/135; 435/159; 435/166; 204/524

(58) Field of Classification Search
None
See application file for complete search history.

(56) References Cited

U.S. PATENT DOCUMENTS

| 2,383,601 | A | 8/1945 | Keim |
| 2,494,366 | A | 1/1950 | Sprules et al. |
| 4,164,506 | A | 8/1979 | Kawahara et al. |
| 5,697,986 | A | 12/1997 | Haas |
| 5,713,965 | A | 2/1998 | Foglia et al. |
| 6,495,014 | B1 | 12/2002 | Datta et al. |
| 6,797,140 | B2 | 9/2004 | Lin et al. |
| 7,141,154 | B2 | 11/2006 | Lin et al. |
| 7,306,934 | B2 | 12/2007 | Arora et al. |
| 7,452,920 | B2 | 11/2008 | Lin et al. |
| 7,507,318 | B2 | 3/2009 | Lin et al. |
| 2007/0243602 | A1 | 10/2007 | Arora et al. |

Primary Examiner — David M Naff
(74) Attorney, Agent, or Firm — Olson & Cepuritis, Ltd.

(57) ABSTRACT

The present invention relates to an integrated method and system for the simultaneous production of biodiesel from free fatty acids (via esterification) and from triglycerides (via transesterification) within the same reaction chamber. More specifically, one preferred embodiment of the invention relates to a method and system for the production of biodiesel using an electrodeionization stack, wherein an ion exchange resin matrix acts as a heterogeneous catalyst for simultaneous esterification and transesterification reactions between a feedstock and a lower alcohol to produce biodiesel, wherein the feedstock contains significant levels of free fatty acid. In addition, because of the use of a heterogeneous catalyst, the glycerol and biodiesel have much lower salt concentrations than raw biodiesel produced by conventional transesterification processes. The present invention makes it much easier to purify glycerol and biodiesel.

4 Claims, 11 Drawing Sheets

ELECTROCHEMICAL METHOD FOR PRODUCING A BIODIESEL MIXTURE COMPRISING FATTY ACID ALKYL ESTERS AND GLYCEROL

RELATED PATENT APPLICATIONS

This invention claims priority to U.S. Provisional Application No. 61/172,385 filed on Apr. 24, 2009, which is hereby incorporated by reference its entirety.

STATEMENT OF GOVERNMENTAL SUPPORT

This invention was made during work supported by the U.S. Department of Energy under Contract No. Contract No. DE-AC02-06CH11357. Therefore, the United States Government has certain rights to this invention.

FIELD OF INVENTION

The present invention relates to a system and method for the production and separation of biodiesel. More specifically one preferred embodiment of the invention relates to a system and method of the integrated production and separation of biodiesel employing an electrodeionization reactor.

BACKGROUND OF INVENTION/SUMMARY OF INVENTION

There is growing interest in replacing current petroleum based fuels with cleaner renewables such as fatty acid alkyl esters (FAAEs) otherwise known as biodiesel. Biodiesel's biodegradability, low-toxicity, high lubricity, and lower emission profile compared to similar fuels make it one of leading contenders to replace petroleum based products.

Biodiesel is typically produced by catalytically reacting vegetable and/or animal fats with short-chain alcohols to produce biodiesel through transesterification or alcoholysis. Traditional transesterification produces a mix of mono-alkyl esters of long chain fatty acids and several by-products including unpurified glycerol. A lipid transesterification production process is then used to convert the base oil to the desired esters.

Free fatty acids (FFAs) in the base oil are either converted to soap and removed from the process, or they are esterified downstream (yielding more biodiesel) using an acidic catalyst. After processing, biodiesel has combustion properties very similar to those of petroleum diesel, and can replace it in most current uses.

One potentially valuable by-product of the transesterification process is the production of glycerol (also commonly referred to as glycerin). In fact, every 1 ton of biodiesel results in the production of about 100 kg of crude glycerol (typically containing ~20% water and catalyst residues). Unfortunately, it is very expensive to purify this crude glycerol into a purified form that can be used directly or as a building block for chemical or pharmaceutical uses.

Although optimized over the years, the basic process and chemistry of biodiesel production remains relatively unchanged. For instance U.S. Pat. No. 4,164,506 discloses a traditional method of biodiesel synthesis employing acid catalysis of fatty acids, while the conversion of triglycerides with base catalysts is described in U.S. Pat. Nos. 2,383,601 and 2,494,366. One of the major deficiencies with prior art chemical production methods is their reliance on the use expensive feedstocks containing low levels of FFA (typically below about 2 weight percent, often less than about 0.5 weight percent) and having lower water content.

Current art systems also employ homogenous strong base or acid catalysts that are corrosive, produce large amounts of waste water and require extensive and costly pretreatment and/or downstream processing.

Although some more recent methods convert both free fatty acids and triglycerides to biodiesel they do not teach simultaneous chemical esterification and transesterification in the same reaction chamber. Instead such systems teach carrying out esterification and transesterification steps in separate reaction chambers as part of multi-step processes. The systems often employ multi-stage approaches to avoid the various problems associated feedstocks containing significant amounts of FFA. Other such systems employ bio-based enzymes in place of chemical reaction systems. See, U.S. Pat. Nos. 5,697,986, and 5,713,965 which are hereby incorporated by reference.

As shown in FIG. 4, traditional chemical processes that employ strong bases such as sodium or potassium hydroxide react with FFA to produce undesirable by-products like soap which lead to decreased biodiesel yields and significant increases in downstream purification costs.

Likewise typical acid catalysts are not suitable for processing feedstock containing FFA for multiple reasons including: (1) an excessive amount of acid catalyst is typically required to convert such feedstocks to biodiesel and (2) since the acids need to be neutralized before processing of biodiesel, the increased level of catalyst results in excessive salt generation which fouls the glycerol.

Therefore, a new method for producing biodiesel which can efficiently process a wide variety of feedstocks, including low cost feedstocks containing high levels of FFA is needed.

SUMMARY OF THE INVENTION

One or more preferred embodiments of the invention relates to a system and method of the integrated production and separation of biodiesel employing an electrodeionization reactor. One preferred embodiment of the present invention relates to an integrated method and system for the simultaneous production of biodiesel from free fatty acids (via esterification) and from triglycerides (via transesterification). More specifically, one preferred embodiment of the invention relates to a method and system for the production of biodiesel using an electrodeionization stack, wherein an ion exchange resin matrix acts as a heterogeneous catalyst for simultaneous esterification and transesterification reactions between a feedstock and a lower alcohol to produce biodiesel, wherein the feedstock contains significant levels of FFA.

One or more embodiments of the invention overcome some of the disadvantages present in the art.

DETAILED DESCRIPTION OF THE PREFERRED EMBODIMENTS

One or more preferred embodiments of the invention relates to a system and method of the integrated production and separation of biodiesel employing an electrodeionization reactor. One preferred embodiment of the present invention relates to an integrated method and system for the simultaneous production of biodiesel from free fatty acids (via esterification) and from triglycerides (via transesterification). More specifically, one preferred embodiment of the invention relates to a method and system for the production of biodiesel using an electrodeionization stack, wherein an ion exchange resin matrix acts as a heterogeneous catalyst for simultaneous esterification and transesterification reactions between a feedstock and a lower alcohol to produce biodiesel, wherein the feedstock may contain significant levels of free fatty acids.

One preferred method of the invention comprises:

providing a electrodeionization catalytic reactor (EDICR) stack having an anode and a cathode and a plurality of chambers positioned between the anode and cathode, wherein at least a portion of the chambers being esterification chambers and at least a portion of the chambers being electrolyte chambers, wherein each esterification chamber is formed from a porous solid ion exchange resin wafer (IERW) interposed between a cation exchange membrane or bipolar exchange membrane, and an anion exchange membrane;

introducing an ion conducting solution into the electrolyte chambers;

introducing a feedstock and a lower alcohol in the esterification chambers, wherein the feedstock comprises: free fatty acids (FFA) and triglycerides;

establishing an electric potential between the EDICR anode and cathode thereby creating a current across the stack that catalyzes the production a raw biodiesel mixture within the esterification chambers via simultaneous esterification and transesterification, the raw biodiesel mixture comprising: fatty acid alkyl esters and glycerol, the current across the stack promoting the reaction of triglycerides present in the feedstock with the lower alcohol in the presence of IERW to produce alkyl esters and glycerol via transesterification;

promoting the reaction of FFA present in the feedstock with the lower alcohol in the presence of the IERW to produce fatty acid alkyl esters and water via esterification;

causing at least a portion of the water created by the esterification reaction to split into protons and hydroxyl anions via electrodeionization in the presence of the IERW;

wherein at least a portion of the formed hydroxyl anions catalyze the transesterification reaction between the lower alcohol and triglycerides to produce alkyl esters and glycerol; and/or wherein at least a portion of the formed protons catalyze the esterification reaction between the FFA and the lower alcohol to produce fatty acid alkyl esters.

Electrodeionization Catalytic Reactor (EDICR) Stack

Figure 6:
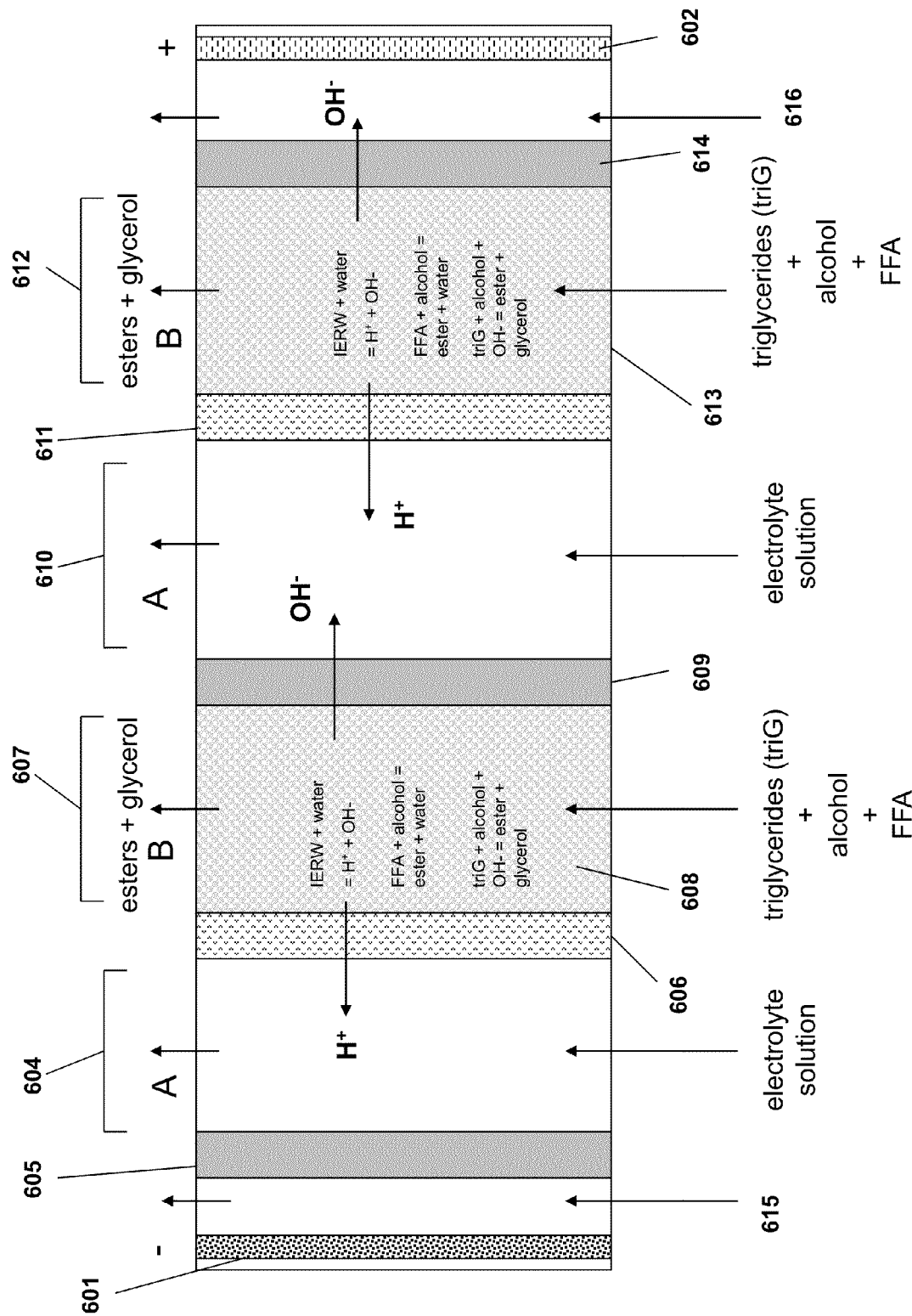
FIG. 6—shows a preferred embodiment of a novel EDICR stack for the production of biodiesel from FFA containing feedstock via simultaneous esterification and transesterification reactions.

One salient aspect of the current invention is the use of an electrodeionization catalytic reactor (EDICR) stack. FIG. 6 illustrates one preferred embodiment of an EDICR stack comprising: a cathode 601, an anode 602, and a plurality of chambers positioned between the anode 602 and cathode 601.

In the illustrative embodiment a first electrolyte chamber 604 is sandwiched between a first anion exchange membrane 605 and a first cation exchange membrane 606. A first transesterification/esterification reaction chamber 607 (reaction chamber) is formed from a first porous solid ion exchange resin wafer (IERW) 608 interposed between the first cation exchange membrane 606 and a second anion exchange membrane 609. A second electrolyte chamber 610 is sandwiched between the second anion exchange membrane 609 and a second cation exchange membrane 611 and finally the second reaction chamber 612 is formed from a second porous solid ion exchange resin wafer (IERW) 613 interposed between the second cation exchange membrane 611 and a third anion exchange membrane 614.

Although the illustrative embodiment only illustrates two electrolyte chambers and two reaction chambers, more or less electrolyte and reaction chambers can be employed within the stack. In one or more preferred embodiments the electrolyte and reaction chambers have a specified ordering sequence: ABAB . . . A, where A represents an electrolyte chamber and B represents a reaction chamber.

As illustrated, each electrolyte chamber is defined by an anion ion exchange membrane one its first side and a cation exchange membrane on its second side, while each esterification reaction chamber comprises an (IERW) interposed between a cation exchange membrane and an anion ion exchanged membrane.

Figure 7:
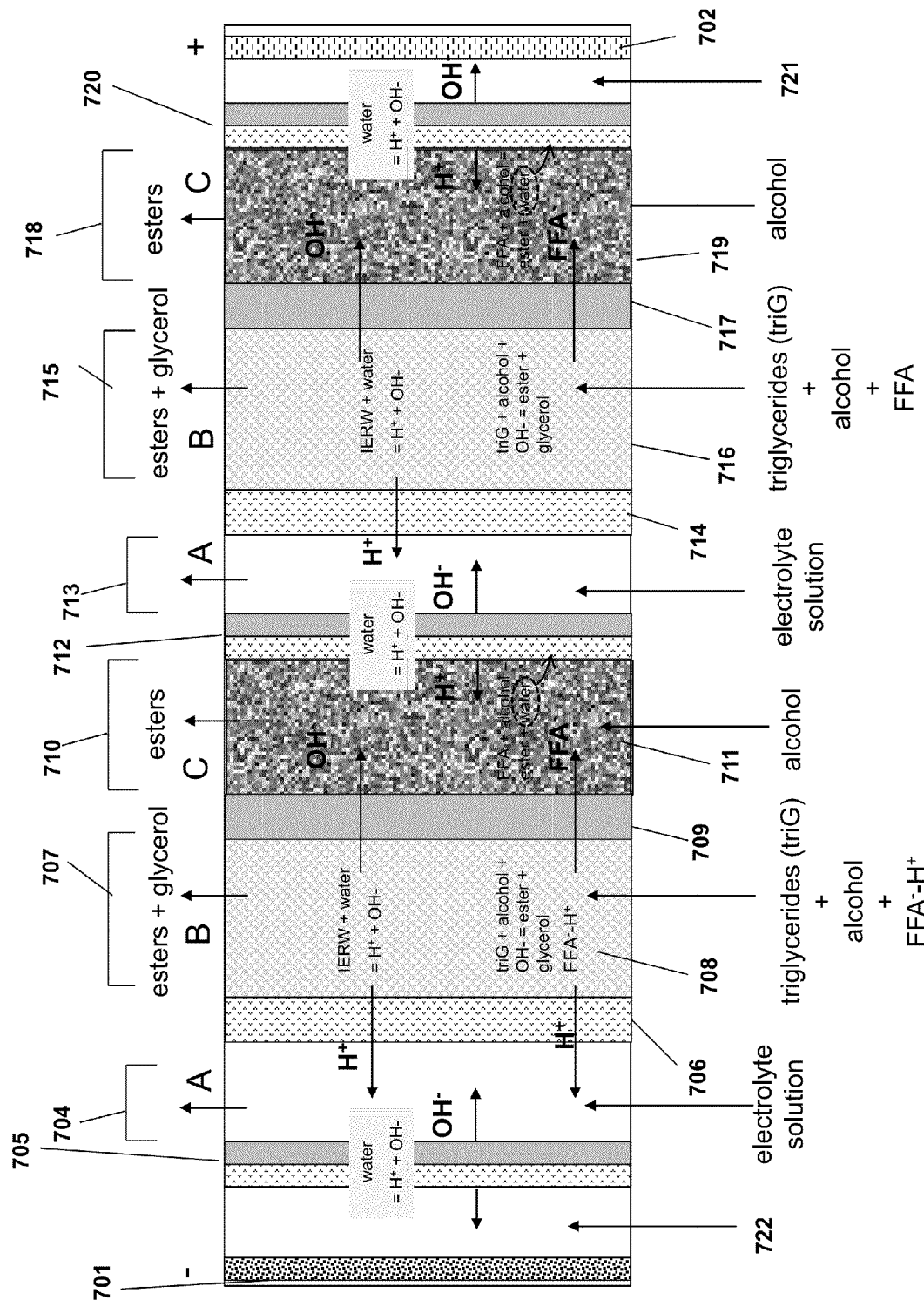
FIG. 7—shows an alternate embodiment of an EDICR stack for the production of biodiesel.

There are different membrane configurations of EDICR can be arranged. One example is illustrated in FIG. 7, where ion-exchange membranes and bipolar membranes are alternated between two metal electrodes, 701 (the cathode) and 702 (the anode).

In the illustrative embodiment a first electrolyte chamber 704 is sandwiched between a first bipolar membrane 705 and a first cation exchange membrane 706. A first transesterification reaction chamber 707 (reaction 1 chamber) is formed from a first porous solid ion exchange resin wafer (IERW) 708 interposed between the first cation exchange membrane 706 and a first anion exchange membrane 709. A first esterification chamber 710 (reaction 2 chamber) is formed from a second porous solid ion exchange resin wafer (IERW) 711 interposed between the first anion exchange membrane 709 and second bipolar membrane 712. A second electrolyte chamber 713 is sandwiched between the second bipolar membrane 712 and a second cation exchange membrane 714 and it starts the series reaction 1 and reaction 2 chambers arrangement as described earlier.

Although the illustrative embodiment only illustrates two electrolyte chambers and four reaction chambers (two each of reaction 1 and reaction 2), more or less electrolyte and reaction chambers can be employed within the stack. In one or more preferred embodiments the electrolyte and reaction chambers have a specified ordering sequence: ABCABC . . . A, where A represents an electrolyte chamber and B represents a reaction 1 chamber and C represents a reaction 2 chamber.

As illustrated, each electrolyte chamber is defined by bipolar membrane one its first side and a cation exchange membrane on its second side, while each transesterification reaction chamber comprises an IERW interposed between a cation exchange membrane and an anion ion exchanged membrane, while each esterification reaction chamber comprises an IERW interposed between an anion exchange membrane and a bipolar membrane.

Ion Exchange Membranes

Bipolar, cation and anion ion exchange membranes can be employed in the present invention with different arrangements as shown in FIGS. 6, 7, 8 and 9. Examples of suitable membranes include the NEOSEPTA BP-1E Bipolar ion exchange membrane, NEOSEPTA—AHA and AMX anion ion exchange membranes, and NEOSEPTA—CMS and CMX cation ion exchange membranes, available for purchase from (ASTOM, Tokyo, Japan).

EDICR Electrodes

Various suitable electrode materials can be employed in EDICR of the present invention including numerous electrical conductors. A myriad of suitable electrode materials known to one of ordinary skill in the art may be used within the scope of the present invention. In one or more embodiments the anode material may be comprised of: nickel, cobalt, nickel, platinum, titanium and other noble metals and noble metal alloys, noble metals (or noble metal alloys) plated on a substrate, metal oxides, stainless steel, graphite, an combinations thereof. In one ore more embodiments the cathode may be comprised of: nickel, cobalt, platinum, silver, and alloys thereof, stainless steel, graphite, ceramics and combinations thereof.

Preferably, the anode material resists electrochemical dissolution by the anodic electrolysis reaction. One suitable anode is a dimension-stable anode (DSA). Stainless steel is a suitable cathode material.

Mixed-Bed Ion-Exchanging Matrices

One salient aspect of the present invention is the use of porous mixed-bed ion-exchange resin matrices. Preferably, the invention employs a porous mixed-bed ion-exchange resin wafer. The resin matrix is employed within the esterification reaction chambers of the EDICR and provide an ionically conductive porous material containing at least one anion exchange moiety and at least one cation exchange moiety. As described in detail below, these mixed-ion resin matrices enable and catalyze the simultaneous esterification and transesterification reactions within the reaction chambers to produce biodiesel without the use of strong bases and/or acids required by prior art methods and systems.

In one or more preferred embodiment the mixed ion-exchanging matrix comprise an ion exchange resin wafer (IERW) which provides the necessary conductive media for the transesterification and esterification reactions. The IERW further enhances the transesterification and esterification reaction by localized water splitting reaction of the ion exchange resins. Much of the water in the reaction chamber is produced by the esterification reaction between the FFA and methanol.

Water splitting is a known phenomenon in the EDI process that produces protons and hydroxyl ions moved due to the applied electric field. The hydroxyl ions created from the water splitting reaction thereby catalyze the transesterification reaction between triglycerides and the lower alcohol to form biodiesel and glycerol. Furthermore the lower alcohol reacts with FFA and the protons (formed from the water splitting) to form biodiesel and water.

The water produced from the esterification reaction continues to provide the water source for the water splitting reaction that produces an excess of hydroxyl ions and protons (hydrogen ions) in the esterification chamber for catalyzing the further esterification and transesterification. Consequently, increasing the water splitting rate by adjusting the applied current also accelerates the rate of ester (biodiesel) production.

In the illustrated embodiment, a portion of the excess hydroxyl ions produced by the water splitting can be transported, via the anion exchange membrane, to an adjacent electrolyte chamber, see FIG. 6. A portion of the excess protons produced by the water splitting can be transported, via the cation exchange membrane, to another adjacent electrolyte chamber. Therefore, in theory, the system can be adjusted so that little to no water accumulates in the reaction compartments and, thus, the hydrolysis of biodiesel (the organic ester) back to FFA is minimized or eliminated. This results in a high conversion yield of organic acid to organic ester.

More details regarding ion-conducting resin wafers are discussed in U.S. Pat. Nos. 7,452,920; 6,495,014; 6,797,140, 7,306,934 and 7,452,920 and U.S. patent application Ser. Nos. 11/082,469, and 11/732,992 all of which are hereby incorporated by reference in their entireties.

One preferred class of wafers are comprised of an ionically conductive porous material with a thermoplastic binder and a method to immobilize ion-exchange resin beads with or without other chemical entities or particles that have been included in the resin wafer. The ion exchange resins include both anion and cation resin particles and combinations thereof. Suitable thermoplastic binders include but are not limited to polypropylene and/or polyethylene polymers. The mixtures is placed into a mold and compressed using a compressing die then heated to form a wafer. The weight percent of resins in the material is variable but is generally between about 30 to about 75 weight percent.

During fabrication of the resin wafers, temperature, pressure, time of fabrication, gas or vapor flow-through rate, and/or the amount of material incorporated into the resin wafer can be controlled. Controlling the conditions and/or method of fabrication enables one to alter the chemical and physical properties of the resin wafers. These alterable properties include durability, porosity, conductivity, chemical specificity, and biochemical specificity. For more information regarding the manipulation of these characteristics see, U.S. Pat. No. 7,452,920 which is incorporated by reference it its entirety.

The mixed-bed IERW contains cation and anion resins mixed over the range from about 3:1 to about 1:3. The amount of binder in the IERW ranges from about 20 wt. % to 7 about 0 wt. %. Examples of cation exchange resin beads for acid catalytic reaction include but not limited to DR-2030 (Dow Chemical, Midland, Mich.), AMBERLYST 39Wet, and AMBERLYST 15Wet (Rohm and Haas, Philadelphia, Pa.). Examples of anion-exchange resin beads include but not limited to AMBERLYST A26OH (Rohm and Haas, Philadelphia, Pa.) and DOWEX MONOSPHERE550A (OH) ((Dow Chemical, Midland, Mich.).

Electrolyte Solution

The solution introduced into the electrolyte chambers can be a myriad ion conduction solutions including but not limited to: electrolyte solutions, salt containing solutions, ionic liquids and/or combination thereof. One example is 5 g/L of NaCl solution or a mixing of alcohol with a hydrophobic ionic liquid, such as 1-hexyl-3-methylimidazolium-bis(trifluoromethylsulfonyl)imide ([hmim]-[Tf2N.

Electrode Rinse Solution

To provide an electric field across the entire EDICR stack, an electrode rinse solution was used for the electrolysis reaction on the cathode and anode electrode surfaces. An example of an electrode rinse is 5 wt % of $Na_2SO_4$.

Feedstock containing Triglycerides and FFA

Another salient aspect of the current invention is the fact that a much broader range of bio-based feedstocks can be utilized including feedstocks with higher concentrations of FFA that are traditionally considered undesirable due to the need for pretreatment or extensive downstream processing that is taught and/or required by prior art methods.

In fact, unlike prior art methods and systems that avoid the use of feedstocks with high FFA concentrations, one or more embodiments of the present invention actually may benefit from the use of FFA containing feedstocks by allowing the simultaneous esterification and transesterification reactions within the same reaction chamber. It should be noted, however, that the current invention could be used to process feedstock with little or no FFA concentrations as well.

Figure 1:
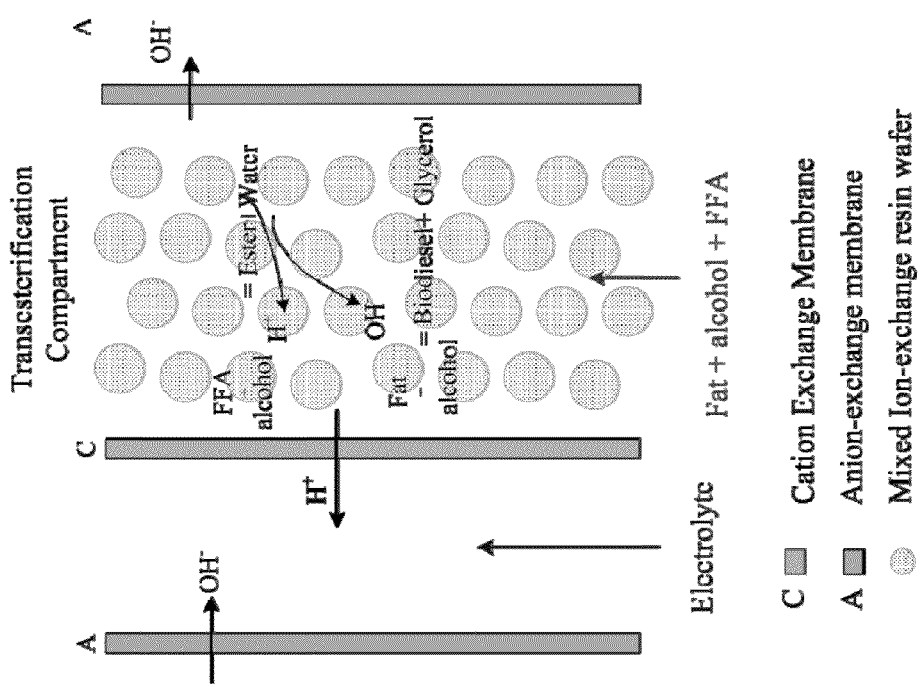
FIG. 1—Illustrates one example of an EDI catalytic reactor (EDICR)
Figure 2:
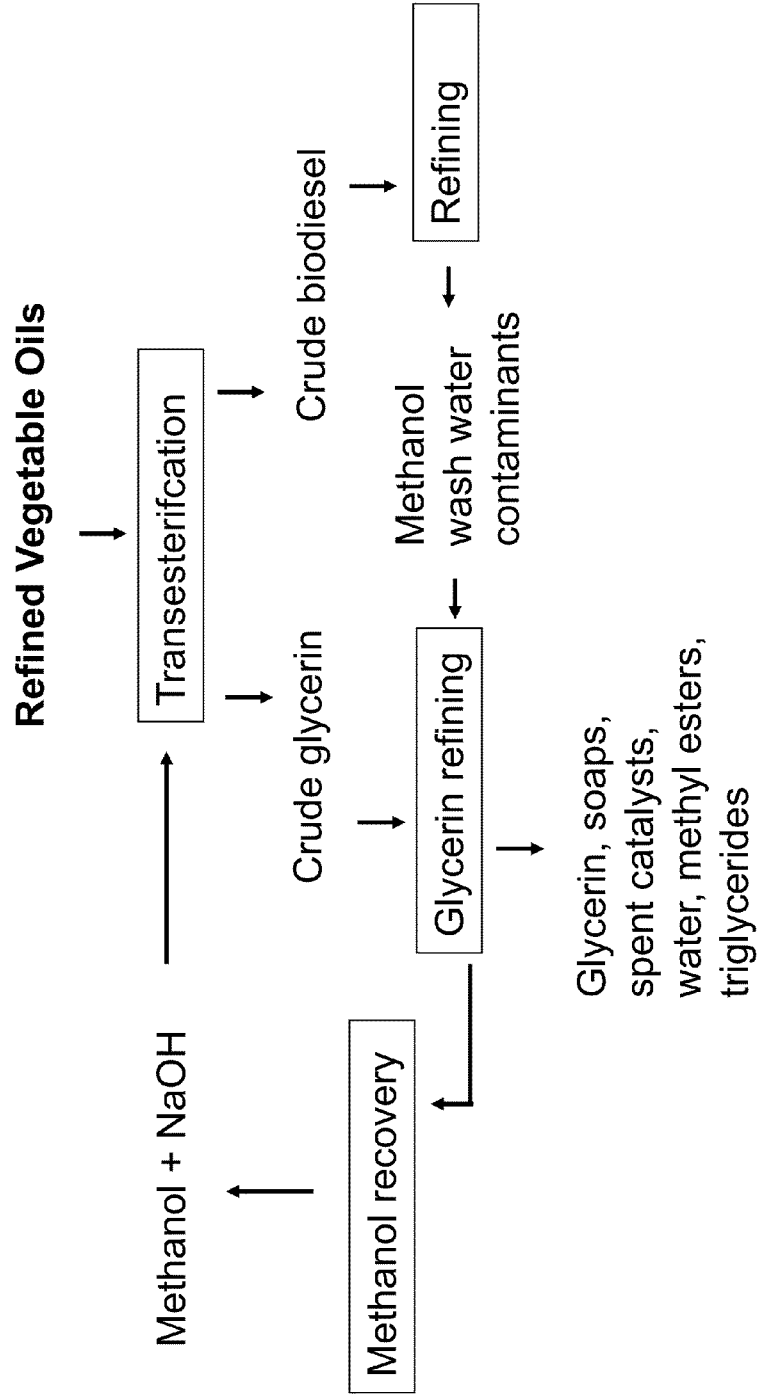
FIG. 2—is a flow chart of a typical prior art method of producing biodiesel via a transesterification.
Figure 3:
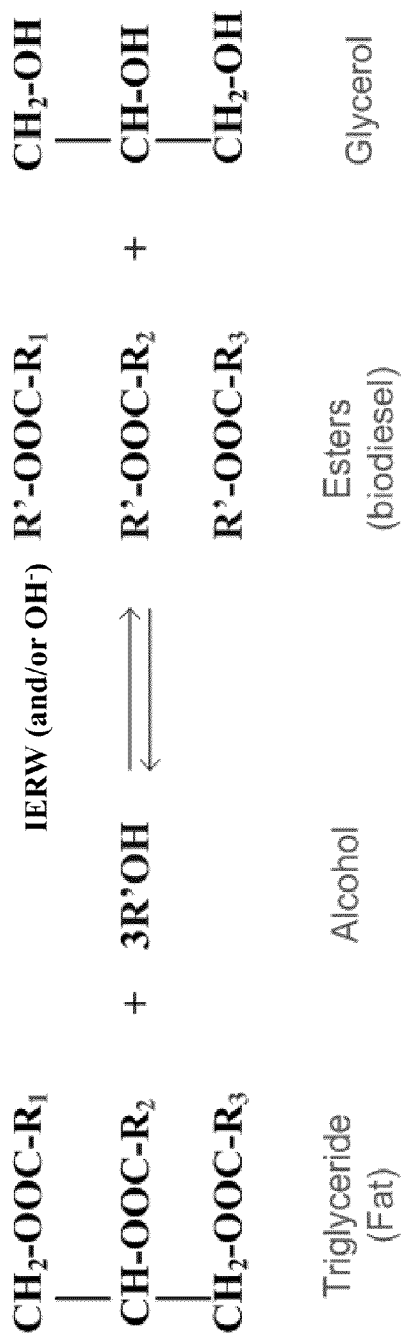
FIG. 3—illustrate a typical transesterification reaction between fat (triglycerides) and an alcohol in the presence of a strong base to produce biodiesel and glycerol. It also shows a typical esterification reaction between a free fatty acid and alcohol in the presence of a strong acid to produce biodiesel and water.
Figure 3:
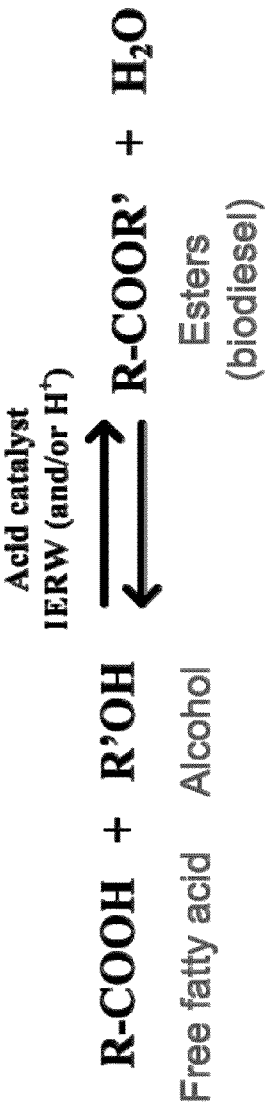
Figure 4:
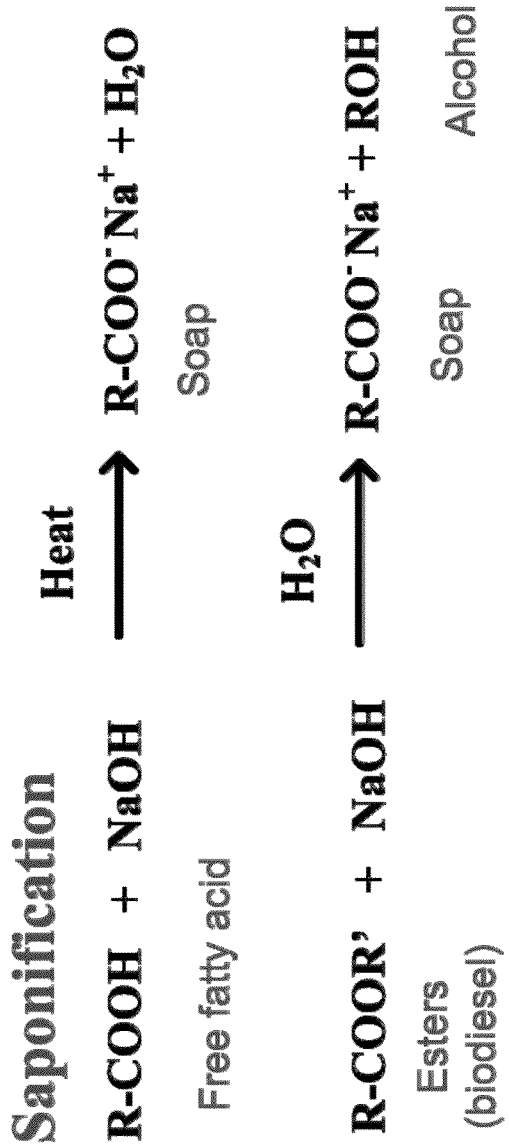
FIG. 4—illustrates saponification reactions between fatty free acids and a base, and biodiesel and a base to form soaps.
Figure 5:
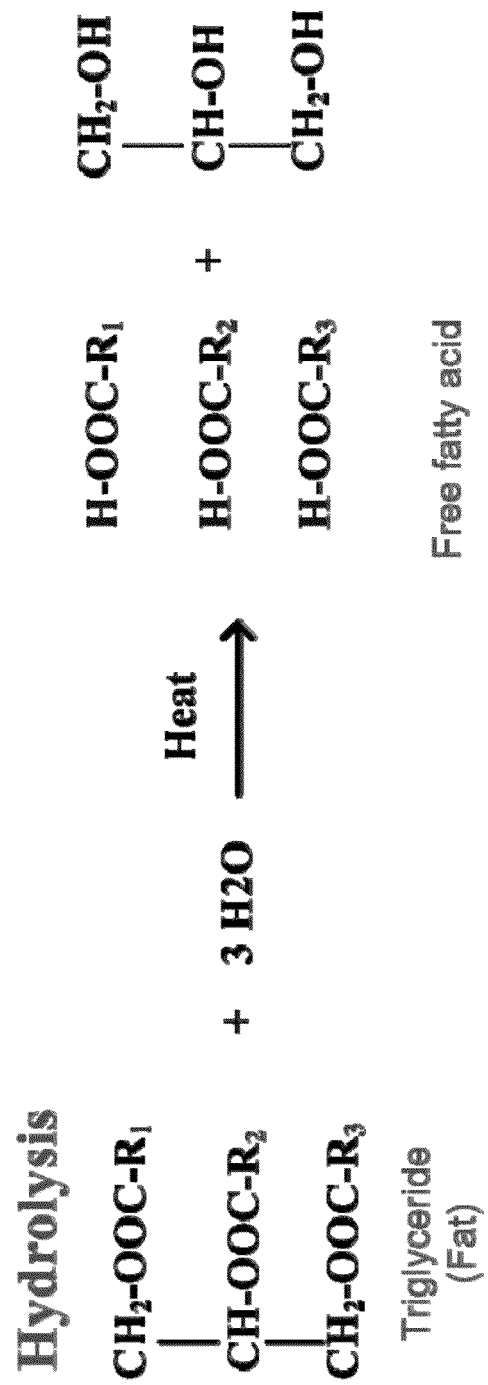
FIG. 5—illustrates a hydrolysis reaction between fat and water forming fatty free acid and glycerol.

Conventional biodiesel production limits the FFA concentration below about 2 wt. % due to saponification (See FIG. 4). Since no base (alkaline cation) is introduced to the reaction chamber of the present invention, there are no restrictions to FFA in the feedstock. The EDICR can preferentially remove water produced by esterification. Thus, the hydrolysis of the biodiesel by water is significantly reduced. Therefore, the ratio of alcohol to the feedstock (triglyceride and/or FFA) can be reduced in comparison to conventional biodiesel production.

Suitable triglyceride feedstocks include fats and oils of synthetic or natural origins and mixtures thereof. Examples of suitable feedstocks include but are not limited to: oils and fats, included vegetable and/or animal sources such as corn oil, linseed oil, rapeseed oil, olive oil, palm oil, jatropha oil, algal oil, canola oil, coconut oil, soybean oil, cotton seed oil, peanut oil, safflower oil, castor bean oil, tallow, lard, coca-butter, fish oils, animal grease, animal fat, vegetable oils, recycled rendered feedstock oils, oil grease, and combinations thereof, and the like.

Lower Alcohol

Suitable alcohols for use in the present invention include lower alcohol (monohydric) alcohols, preferably mono-hydric aliphatic alcohols. Preferred alcohols for use in the transesterification process of the present invention are methanol, ethanol, propanol, butanol, and isopropanol, wherein methanol and ethanol are the most preferred.

Although some of the examples employ the use of methanol, one skilled in the art will realize that other alcohols can also be employed.

Establishing an Electric Potential Across the EDICR Stack

In EDICR, the removal of water product from the esterification reaction by water splitting (into proton and hydroxide ions) under an electric potential can enhance the forward reaction. The water splitting reaction is controlled by the potential across the IERW in the EDICR. Although high voltages (around 4-8 volts per resin wafer chamber) are needed to split water, the overall power needed is small due to very low current produced from water splitting.

Promoting Simultaneous Esterifcation and Transesterfication Reactions

Establishment of an electric potential across the EDICR creates a current across the stack that catalyzes the production of raw biodiesel mixture within the esterification chambers via simultaneous esterification and transesterification, the raw biodiesel mixture comprising: fatty acid alkyl esters and glycerol.

The current across the stack promotes the reaction of triglycerides present in the feedstock with the lower alcohol in the presence of the IERW to produce alkyl esters and glycerol via transesterification;

The current across the stack also promotes the reaction of the FFA present in the feedstock with the lower alcohol in the presence of IERW to produce fatty acid alkyl esters and water via esterification; causing at least a portion of the water created by the esterification reaction to split into protons and hydroxyl anions via electrodeoinization in the presence of IERW; wherein at least a portion of the formed hydroxyl anions further catalyze the transesterification reaction between the lower alcohol and triglycerides to produce alkyl esters and glycerol; and wherein at least a portion of the formed protons further catalyze the esterification reaction between the FFA and the lower alcohol to produce fatty acid alkyl esters.

Reaction Conditions

EDICR for biodiesel production can be operated around 30-50° C. No acids, bases, or buffers are required to adjust pH.

Separation of Glycerol and Biodiesel

Since glycerol is immiscible in biodiesel, a simple phase separation can be used to separate glycerol and biodiesel. Various phase separation techniques known in the art can be employed.

EXAMPLES

Examples of biodisiel production from soybean using EDICR was described in the following section. The configurations illustrated in FIGS. 8 and 9 were utilized.

Figure 8:
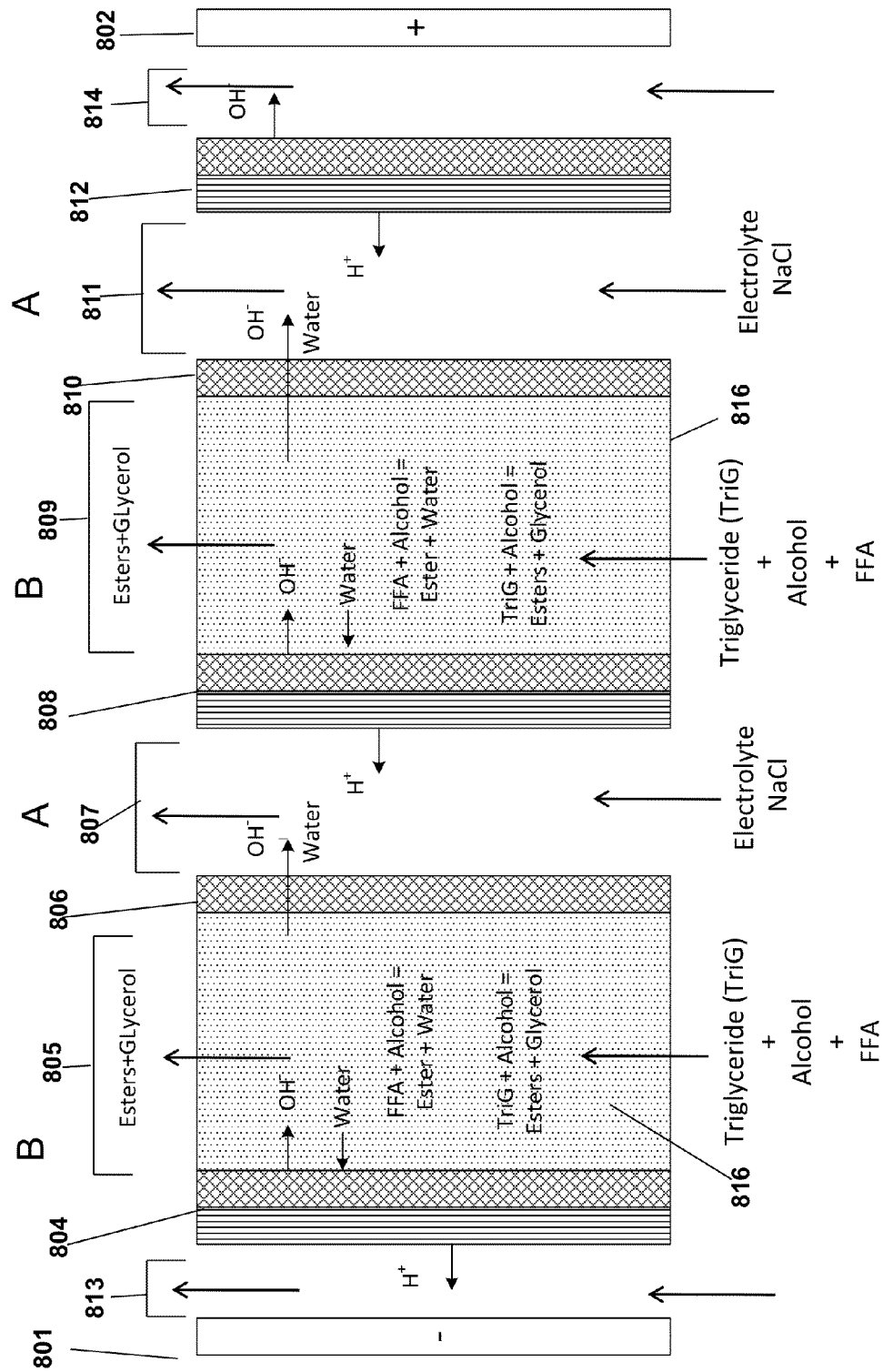
FIG. 8—shows another alternate embodiment of an EDICR stack for the production of biodiesel.

In the illustrative embodiment shown in FIG. 8, a first transesterification/esterification reaction chamber 805 (reaction chamber) is formed from a first porous solid ion exchange resin wafer (IERW) 815 interposed between the first bipolar exchange membrane 804 and a first anion exchange membrane 806. A first electrolyte chamber 807 is sandwiched between the first anion exchange membrane 806 and the second bipolar exchange membrane 808. A second reaction chamber 809 is formed from a second porous solid ion exchange resin wafer (IERW) 816 interposed between the second bipolar exchange membrane 808 and a second anion exchange membrane 810. A second electrolyte chamber 811 is sandwiched between the second anion exchange membrane 810 and a third bipolar exchange membrane 812. Electrode rinse chambers 813 and 814 can be formed adjacent to either electrodes.

Figure 9:
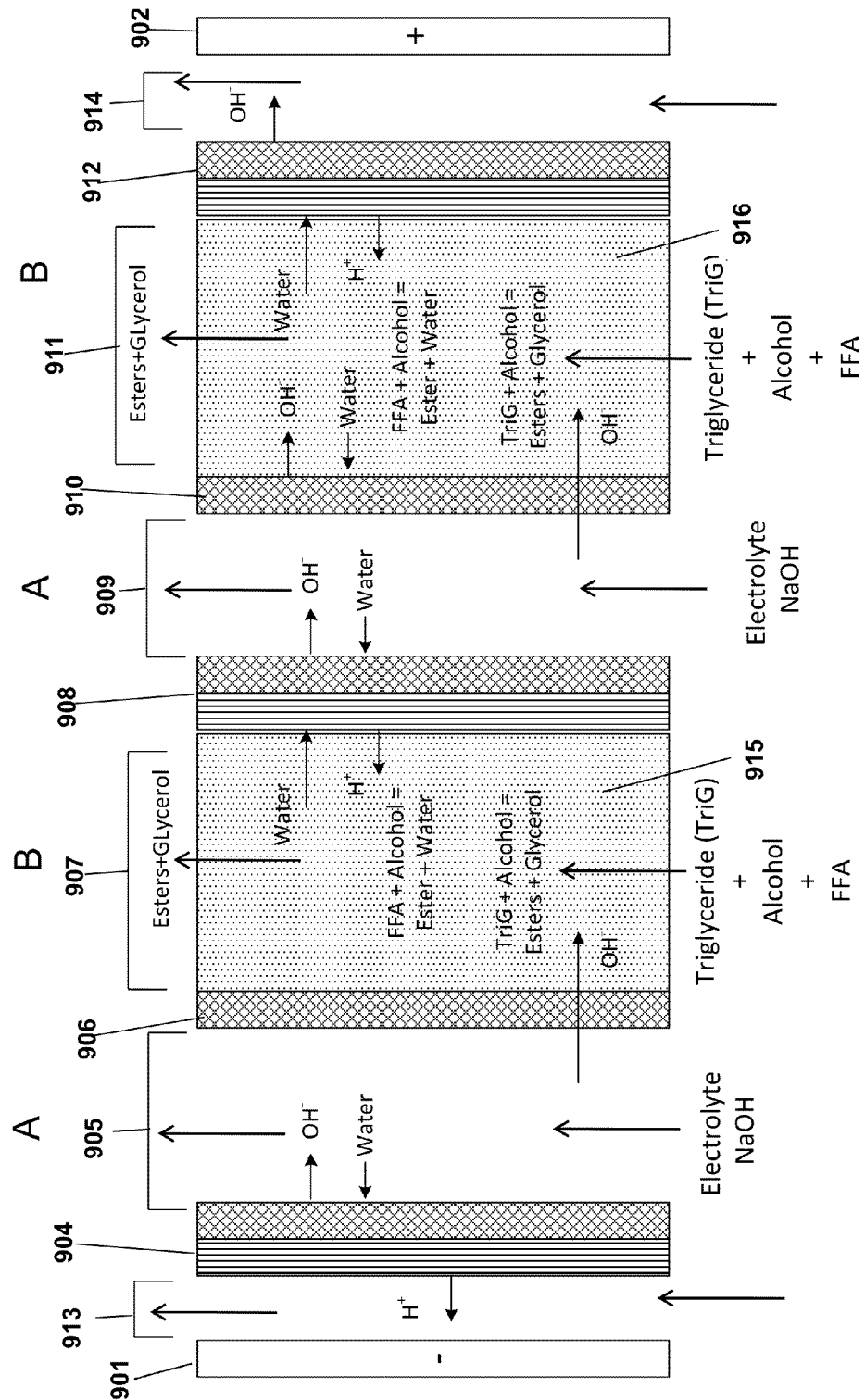
FIG. 9—shows yet another alternate embodiment of an EDICR stack for the production of biodiesel.

In the illustrative embodiment shown in FIG. 9, a first electrolyte chamber 905 is sandwiched between a first bipolar exchange membrane 904 and a first anion exchange membrane 906. A first transesterification/esterification reaction chamber 907 (reaction chamber) is formed from a first porous solid ion exchange resin wafer (IERW) 915 interposed between the first anion exchange membrane 906 and a second bipolar exchange membrane 908. A second electrolyte chamber 909 is sandwiched between the second bipolar exchange membrane 908 and a second anion exchange membrane 910 and finally the second reaction chamber 911 is formed from a second porous solid ion exchange resin wafer (IERW) 916 interposed between the second anion exchange membrane 910 and a third bipolar exchange membrane 912. Electrode rinse chambers 913 and 914 can be formed adjacent to either electrodes.

Several experiments were carried out to demonstrate the technical feasibility of biodiesel production using EDICR in the format based on FIG. 6 (i.e., the ABAB . . . format)

Experimental Apparatus and Setup

The soybean oil composition is found in Table I. The feed solution contained mixture of 5:1 soybean oil to methanol (w/w). The electrolyte contained 1.5 MNaCl+various NaOH concentration. 5% $Na_2SO_4$ was used in the electrode rinse solution. The EDICR was operated at temperature of 45° C. Two different types of ion-exchange resin were used, AMBERLYST 26 and IRA67 by DOW (Dow Chemical, Midland, Mich.).

TABLE I

Soybean oil composition

| Fatty Acid | Wt. Percent |
|---|---|
| Palmitic | 12 |
| Stearic | 5 |
| Oleic | 25 |
| Linoleic | 52 |
| Linolenic | 6 |

Anion, cation and bipolar ion-exchange membranes were purchased from Ameridia, Inc. Glycerol and biodiesel were analyzed using HPLC with HPX87H (Bio-Rad, Hercules, Calif.).

45 g of soybean oil (sometimes 100 g) and 9 g of methanol (18 g methanol for 100 g soybean oil) are taken into glass beaker and heated to 40-45° C. Two different types of membrane configuration (MC) of EDICR stacks were assembled with the configurations showed in FIGS. 8 (MC #1) and 9 (MC #2). The mixture of soybean oil and methanol was used in the reaction compartments and an ion conducting electrolyte was used in the other compartment.

The resin beads are chosen such that they are already functionalized with hydroxyl ions and also can produce hydroxyl ions by water splitting. The water necessary for generation of the hydroxyl ions are supplied with the reaction mixture. The amount of biodiesel production is indirectly quantified by measuring the amount of glycerol produced. Glycerol is analyzed using an HPX87H acid column (from Bio-Rad) in HPLC.

Results

Figure 10:
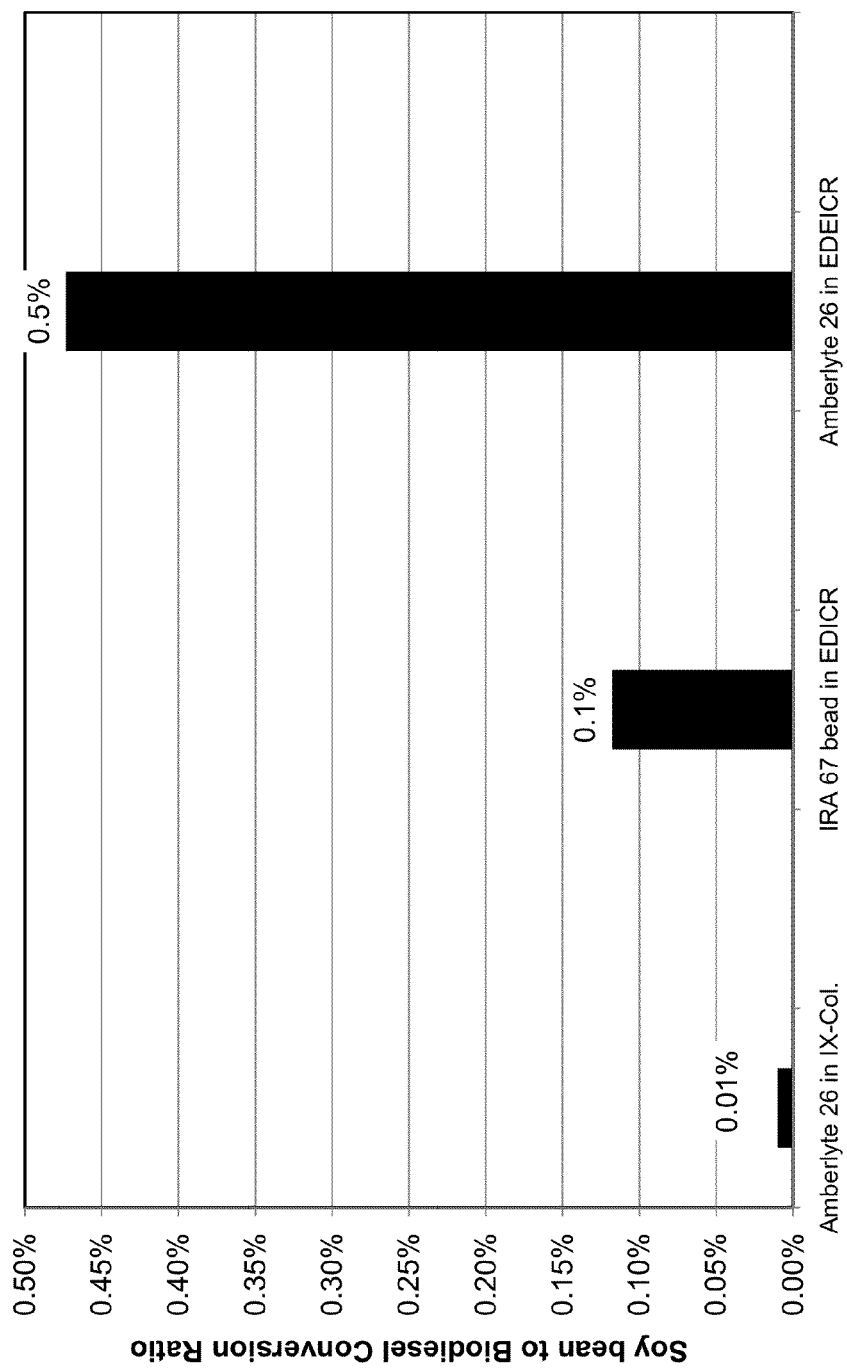
FIG. 10—shows the biodiesel conversion rates using Ambelyst A26 resin in an ion exchange column (near 0 conversion rate), IRA 67 beads in an EDICR showing enhanced conversion and Amberlyst A26 in an EDICR showing yet further enhanced conversion.
Figure 11:
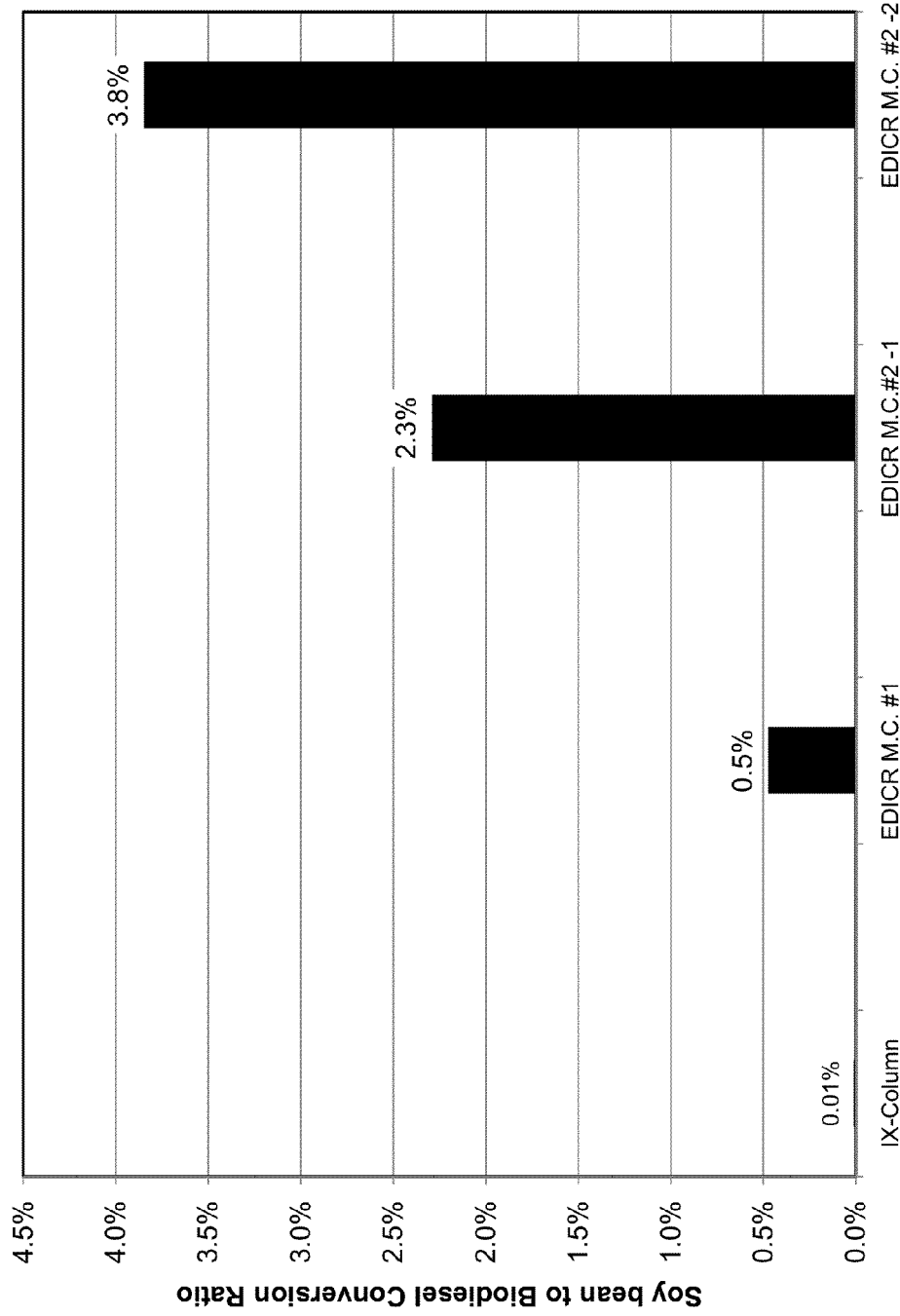
FIG. 11—shows the biodiesel conversion rates using Amberlite 26 resin in an ion exchange column (near 0 conversion rate), Amberlyst A26 in an EDICR (MC #1) showing enhanced conversion and Amberlyst A26 in an EDICRs (MC #2-1 and MC #2-2) showing yet further enhanced conversion.

Although both Amberlyte 26 or IRA67 were reported to work as base catalysts, it was found that at the 45° C. temperature, very little (near no) transesterification was observed using a standard ion exchange system. However, resin wafers containing either the Amberlyte 26 or IRA 67 used in the invented EDICR, showed distinct transesterification. FIG. 10 shows the bioconversion ratio of soy bean oil to biodiesel and glycerol. Under the working temperature, both IRA and Amberlyte 26 resin wafer EDICR appeared noticeable bioconversion using a membrane configuration of FIG. 8. An order-in-magnitude enhanced of bioconversion ratio was observed when Amerlyte 26 resin wafer EDICR was operated under different membrane configuration (as FIG. 9). In the experiments using MC #2-1 and MC#2-2, 0.1-0.5 N NaOH was added into the electrolyte solution which is believed to have contributed significantly to the increased conversion rates for those two configurations. FIG. 11 shows the comparison of bioconversion ratios using different membrane configurations in EDICR.

Based on these experimental results, we believe a resin wafer containing enhanced ion-exchange resin catalysts such as PA308, PA306 from (Diaion/Mitsubishi Chemical, Tokyo, Japan) or similar catalysts will show significant improvement of bioconversion ratio. Nevertheless, the experimental results shown above have demonstrated the technical feasibility of using resin wafer EDICR for biodiesel production.

Having described the basic concept of the invention, it will be apparent to those skilled in the art that the foregoing detailed disclosure is intended to be presented by way of example only, and is not limiting. Various alterations, improvements, and modifications are intended to be suggested and are within the scope and spirit of the present invention. Additionally, the recited order of the elements or sequences, or the use of numbers, letters or other designations therefore, is not intended to limit the claimed processes to any order except as may be specified in the claims. All ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like refer to ranges which can be subsequently broken down into sub-ranges as discussed above. Accordingly, the invention is limited only by the following claims and equivalents thereto.

All publications and patent documents cited in this application are incorporated by reference in their entirety for all purposes to the same extent as if each individual publication or patent document were so individually denoted.

What is claimed is:

1. An electrochemical method for simultaneously producing a biodiesel mixture comprising fatty acid alkyl esters and glycerol from free fatty acids (FFA) via esterification and from triglycerides via transesterification comprising:

providing a electrodeionization catalytic reactor (EDICR) stack having an anode and a cathode and a plurality of alternating electrolyte chambers and esterification chambers positioned between the anode and cathode, wherein each esterification chamber is formed from a porous solid ion exchange resin wafer (IERW) interposed between a bipolar exchange membrane, and an anion exchange membrane, a first bipolar exchange membrane being positioned adjacent the cathode and spaced from the anion exchange membrane of a first esterification chamber to define a first electrolyte chamber between the first bipolar exchange membrane and the first esterification chamber; each subsequent electrolyte chamber in the plurality of electrolyte chambers being defined by a spacing between the bipolar exchange membrane of one esterification chamber and the anion exchange membrane of an adjacent esterification chamber; and wherein the anode is adjacent the bipolar membrane of a last esterification chamber in the plurality of esterification chambers;

introducing an ion conducting solution comprising a hydroxide salt into the electrolyte chambers;

introducing a feedstock and a lower alcohol in the esterification chambers, wherein the feedstock comprises: free fatty acids (FFA) and triglycerides;

establishing an electric potential between the EDICR anode and cathode thereby creating a current across the stack that catalyzes the production of a biodiesel mixture within the esterification chambers via simultaneous esterification and transesterification, the formed biodiesel mixture comprising: fatty acid alkyl esters and glycerol, the current across the stack:

promoting the reaction of triglycerides present in the feedstock with the lower alcohol in the presence of the IERW to produce alkyl esters and glycerol via transesterification;

promoting the reaction of the FFA present in the feedstock with the lower alcohol in the presence of the IERW to produce fatty acid alkyl esters and water via esterification;

causing at least a portion of the water created by the esterification reaction to split into protons and hydroxyl anions via electrodeionization in the presence of the IERW;

wherein at least a portion of the formed hydroxyl anions catalyze the transesterification reaction between the lower alcohol and triglycerides to produce alkyl esters and glycerol; and wherein at least a portion of the formed protons catalyze the esterification reaction between the FFA and the lower alcohol to produce fatty acid alkyl esters.

2. The method of claim 1, further comprising the step of removing the biodiesel mixture from the esterification chambers and separating the fatty acid alkyl esters and glycerol.

3. The method of claim 1, wherein a portion of the hydroxyl anions and protons migrate to adjacent chambers, said migration of ions being facilitated by the electric potential established across the EDICR anode and cathode.

4. The method of claim 1 wherein the IERW contains anion and cation moieties and wherein the ratio between anion and cation moieties is between about 3:1 to about 1:3.

* * * * *